(12) United States Patent
Yang et al.

(10) Patent No.: US 10,627,930 B2
(45) Date of Patent: Apr. 21, 2020

(54) TOUCH SENSOR AND TOUCH PANEL HAVING THE SAME

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Yue-Feng Yang, Guangdong (CN); Po-Lin Chen, Guangdong (CN); Yen-Heng Huang, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTINS LIMITED, Miaoli County (TW)

( * ) Notice: Subject to any disclaimer, the term of this patent is extended or adjusted under 35 U.S.C. 154(b) by 0 days.

(21) Appl. No.: 16/027,366

(22) Filed: Jul. 4, 2018

(65) Prior Publication Data
US 2019/0377434 A1     Dec. 12, 2019

(30) Foreign Application Priority Data
Jun. 11, 2018 (CN) .......................... 2018 1 0595126

(51) Int. Cl.
*G06F 3/041* (2006.01)
*G06F 1/16* (2006.01)

(52) U.S. Cl.
CPC ............ *G06F 3/041* (2013.01); *G06F 1/1641* (2013.01); *G06F 1/1643* (2013.01); *G06F 1/1652* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2012/0287066 A1* | 11/2012 | Yang | ..................... | G06F 1/1626 345/173 |
| 2015/0338943 A1* | 11/2015 | Donnelly | ................ | G06F 3/041 345/173 |
| 2018/0081481 A1* | 3/2018 | Fournier | ............. | H01M 2/1016 |

* cited by examiner

*Primary Examiner* — Brian M Butcher
(74) *Attorney, Agent, or Firm* — CKC & Partners Co., LLC

(57) ABSTRACT

A touch panel includes a light-transmissive cover, a display module, and a touch sensing layer. The display module is disposed on the light-transmissive cover. The touch sensing layer is disposed between the light-transmissive cover and the display module, and has a first side and a second side opposite to the first side. The first side has a first folding region, and the second side has a second folding region. When the first side and the second side of the touch sensing layer are unfolded, the first folding region and the second folding region extend outward from two opposite edges of the light-transmissive cover. When the first side and the second side of the touch sensing layer are folded, the first folding region and the second folding region are located on the display module.

7 Claims, 2 Drawing Sheets

TOUCH SENSOR AND TOUCH PANEL HAVING THE SAME

CROSS-REFERENCE TO RELATED APPLICATION

This application claims priority to Chinese Application Serial Number 201810595126.6 filed Jun. 11, 2018, the disclosure of which is incorporated herein by reference in its entirety.

BACKGROUND

Along with the popularity of electronic devices such as smart phones and tablet computers, the development of display devices tends towards the objects of lightness, thinness and smallness and multiple functions, in which a narrow border design is a target endeavored by research and development personnel. The disposition of a border may increase the total volume of a display device, reduce an effective display area of the display device, and increase the weight of the display device. However, the border can reinforce and fix the structure, and a weak structure problem may occur if no border exists.

In a conventional touch panel with a touch sensing layer, a physical dimension of the touch sensing layer is smaller than that of a light-transmissive cover. In order to achieve the narrow border design, most conventional methods are to modify a display module or an electrode structure, so as to make up the insufficiency of the border design.

SUMMARY

One aspect of the present disclosure is to provide a touch panel. The touch panel includes a light-transmissive cover, a display module, and a touch sensing layer. The display module is disposed on the light-transmissive cover. The touch sensing layer is disposed between the light-transmissive cover and the display module, and has a first side and a second side opposite to the first side. The first side has a first folding region, and the second side has a second folding region. When the first side and the second side of the touch sensing layer are unfolded, the first folding region and the second folding region extend outward from two opposite edges of the light-transmissive cover. When the first side and the second side of the touch sensing layer are folded, the first folding region and the second folding region are located on the display module.

In some embodiments of the present disclosure, when the first side and the second side of the touch sensing layer are folded, each of the first folding region and the second folding region is overlapped with a portion of the light-transmissive cover and a portion of the display module.

In some embodiments of the present disclosure, the touch sensing layer has an active region and a periphery region that surrounds the active region, and the first folding region and the second folding region are located in the periphery region.

In some embodiments of the present disclosure, the touch panel further includes an optical clean adhesive disposed between the touch sensing layer and the light-transmissive cover.

In some embodiments of the present disclosure, the optical clean adhesive further extends to the first folding region or the second folding region of the touch sensing layer.

In some embodiments of the present disclosure, the touch panel further includes an optical clean adhesive disposed between the display module and the touch sensing layer.

In some embodiments of the present disclosure, when the first side and the second side of the touch sensing layer are unfolded, a ratio of a length of the touch sensing layer to a length of the light-transmissive cover is greater than 1 and smaller than 2.

In some embodiments of the present disclosure, when the first folding region and the second folding region are folded, the light-transmissive cover, the touch sensing layer, and the display module collectively form a first projection area; and when the first side and the second side are spread, the light-transmissive cover and the touch sensing layer collectively form a second projection area that is larger than the first projection area.

In some embodiments of the present disclosure, the touch sensing layer further includes at least one conductive trace and a bonding pad, and the conductive trace is electrically connected to the display module and the bonding pad.

In some embodiments of the present disclosure, the touch panel has a third side adjacent to the first side and the second side, and the bonding pad is disposed on the third side of the touch panel.

In the foregoing embodiments of the present disclosure, when the touch sensing layer is unfolded, the first side and the second side of the touch sensing layer can extend outward from the two opposite edges of the light-transmissive cover, and thus the length of the touch sensing layer would not be limited by the length of the light-transmissive cover, and it is more flexible to choose the touch sensing layer. Furthermore, by applying the aforesaid design, after the first folding region and the second folding region of the touch sensing layer are folded onto the display module, the areas of the first folding region and the second folding region on the display module is large enough to improve the attachment efficacy of the touch sensing layer, and further to increase the stability and the yield of the touch panel.

DETAILED DESCRIPTION

Figure 1:
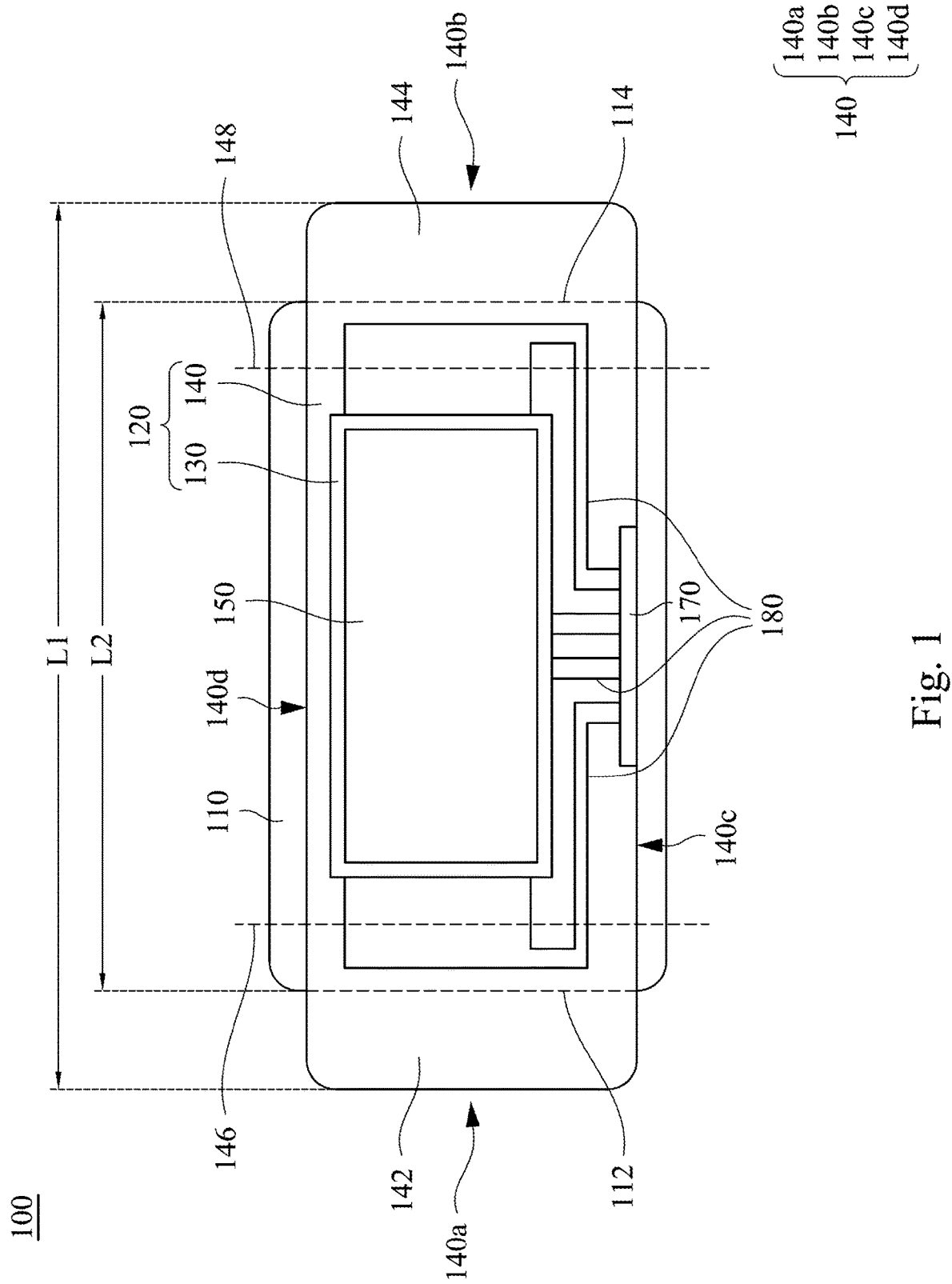
FIG. 1 is a top view of a touch panel when the touch sensing layer is unfolded according to one embodiment of the present disclosure.

The following disclosure provides different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed that are between the first and second features, such that the first and second features are not in direct contact. In addition, the present disclosure may repeat reference numerals and/or letters in the various examples. This repetition does not in itself dictate a relationship between the various embodiments and/or configurations discussed.

FIG. 1 is a top view of a touch panel 100 when a touch sensing layer 120 is unfolded according to one embodiment of the present disclosure. As shown in the figure, the touch panel 100 includes a light-transmissive cover 110, the touch sensing layer 120, and a display module 150. The display module 150 is located on the light-transmissive cover 110 and the touch sensing layer 120, and the touch sensing layer 120 is located between the light-transmissive cover 110 and the display module 150.

The touch sensing layer 120 includes an active region 130 and a periphery region 140. The periphery region 140 surrounds the active region 130, and the periphery region 140 can be divided into a first side 140a, a second side 140b, a third side 140c, and a fourth side 140d. The first side 140a is adjacent to the third side 140c and the fourth side 140d, and the second side 140b is adjacent to the third side 140c and the fourth side 140d. The first side 140a is opposite to the second side 140b, and the third side 140c is opposite to the fourth 140d. The periphery region 140 includes a first folding region 142 and a second folding region 144 that can be folded on the display module 150. Furthermore, the first folding region 142 is located at the first side 140a of the periphery region 140, and the second folding region 144 is located at the second side 140b of the periphery region 140.

The light-transmissive cover 110 has a first edge 112 and a second edge 114 opposite to the first edge 112. The first edge 112 is located below the first side 140a, and the second edge 114 is located below the second side 140b. In other words, when the first side 140a and the second side 140b are unfolded, a portion of the first folding region 142 extend outward from the first edge 112 of the light-transmissive cover 110, and a portion of the second folding region 144 extend outward from the second edge 114 of the light-transmissive cover 110. In the present embodiment, the area of the first folding region 142 is substantially the same as that of the second folding region 144. In other embodiments, the area of the first folding region 142 is different from that of the second folding region 144 may be different.

Figure 2:
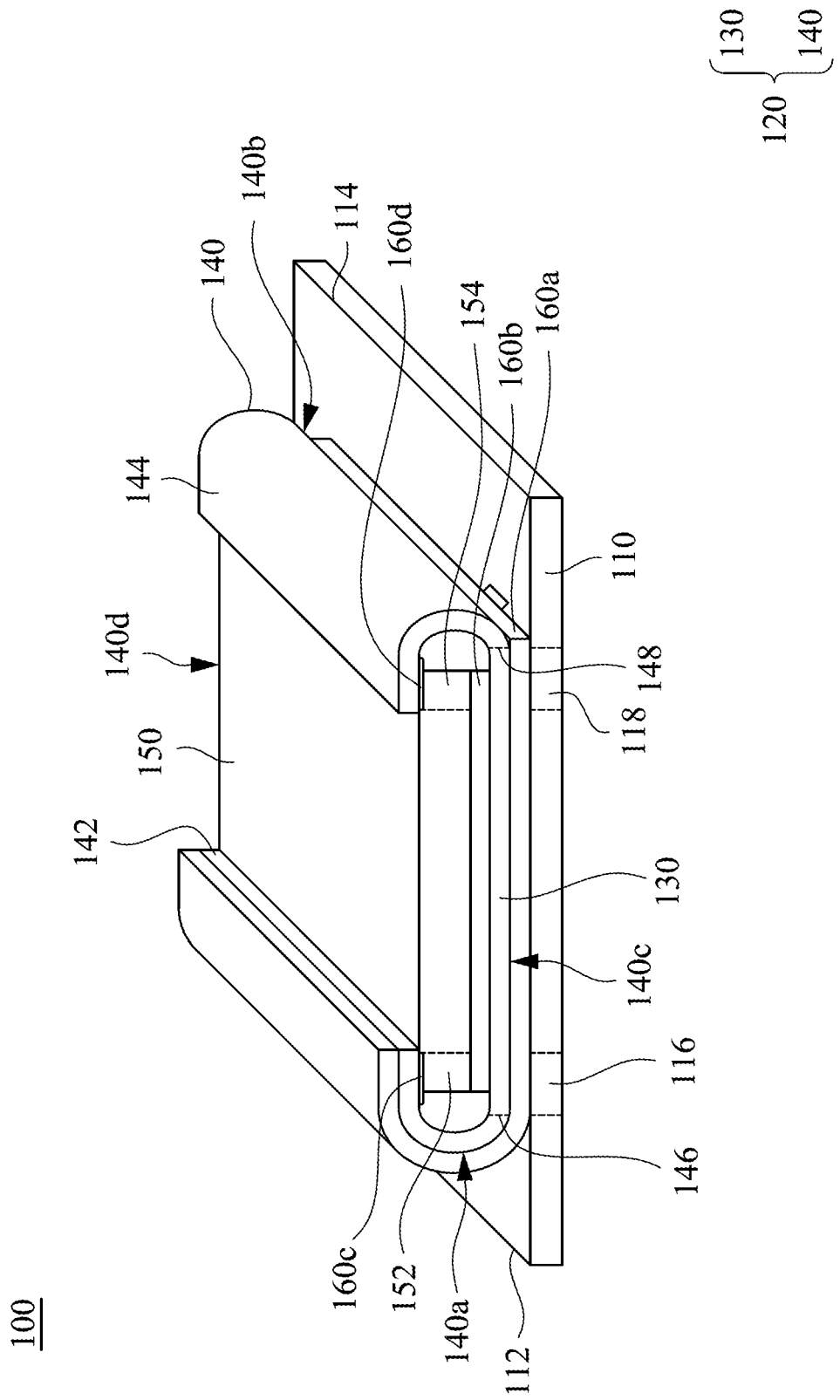
FIG. 2 is a perspective view of the touch sensor layer shown in FIG. 1 when the touch sensing layer is folded.

FIG. 2 is a perspective view of the touch sensor shown in FIG. 1 when the touch sensing layer is folded. References are made to FIG. 1 and FIG. 2 simultaneously. When the first side 140a of the touch sensing layer 120 is folded, a portion of the first folding region 142 is overlapped with a first portion 152 of the display module 150 and a first portion 116 of the light-transmissive cover 110. When the second side 140b of the of the touch sensing layer 120 is folded, a portion of the second folding region 144 is overlapped with a second portion 154 of the display module 150 and a second portion 118 of the light-transmissive cover 110.

When the first side 140a of the touch sensing layer 120 is folded, the first side 140a has a first folding line 146. The first folding line 146 is located at the first folding region 142 and close to the active region 130, but does not extend outward from the first edge 112 of the light-transmissive cover 110. In other words, the first folding line 146 is located between the active region 130 of the touch sensing layer 120 and the first edge 112 of the light-transmissive cover 110. When the second side 140b of the touch sensing layer 120 is folded, the second side 140b has a second folding line 148. The second folding line 148 is located at the second folding region 144 and close to the active region 130, but does not extend outward from the second edge 114 of the light-transmissive cover 110. In other words, the second folding line 148 is located between the active region 130 of the touch sensing layer 120 and the second edge 114 of the light-transmissive cover 110. In the present embodiment, the first folding line 146 is substantially parallel to the second folding line 148, but the present disclosure is not limited in this regard.

In the present embodiment, when the touch sensing layer 120 is unfolded, the first side 140a and the second side 140b of the touch sensing layer 120 can extend outward from the two opposite edges of the light-transmissive cover 110, and thus the length of the touch sensing layer 120 would not be limited by the length of the light-transmissive cover 110. Furthermore, by applying the aforesaid design, after the first folding region 142 and the second folding region 144 of the touch sensing layer 120 are folded onto the display module 150, the areas of the first folding region 142 and the second folding region 144 on the display module 150 is large enough to improve the attachment efficacy of the touch sensing layer 120 and to increase the stability and the yield of the touch panel 100.

Reference is made to FIG. 1. In the present embodiment, the touch sensing layer 120 further includes conductive traces 180 and a bonding pad 170, in which two ends of the conductive traces 180 are electrically connected to the display module 150 and the bonding pad 170, respectively. The bonding pad 170 is disposed on the third side 140c of the touch sensing layer 120. In the present embodiment, a part of the conductive traces 180 are disposed along the first side 140a and the third side 140c of the touch sensing layer 120, another part of the conductive traces 180 are disposed along the third side 140c of the touch sensing layer 120, and another part of the conductive traces 180 are disposed along the second side 140b and the third side 140c of the touch sensing layer 120, in which the fourth side 140d of the touch sensing layer 120 is free of the conductive traces 180. The aforesaid number and configuration of the conductive traces 180 are merely shown as an example, and do not intend to limit the present disclosure.

Reference is made to FIG. 2. In the present embodiment, the touch panel 100 further includes optical clean adhesive 160a, 160b, 160c and 160. The optical clean adhesive 160a is disposed between the touch sensing layer 120 and the light-transmissive cover 110. The optical clean adhesive 160a further extends to the first folding region 142 of the touch sensing layer 120. In this way, when the touch sensing layer 120 is folded, a portion of the optical clean adhesive 160a can be folded onto the display module 150 along with the first folding region 142. The optical clean adhesive 160b is disposed between the display module 150 and the touch sensing layer 120. The optical clean adhesive 160c is disposed between the first folding region 142 and the first portion 152 of the display module 150, and the optical clean adhesive 160d is disposed between the second folding region 144 and the second portion 154 of the display module 150. In other embodiments, the optical clean adhesive 160a may further extend to the second folding region 144, or merely extend to the second folding region 144 but does not extend to the first folding region 142, but the present disclosure is not limited thereto.

References are made to FIG. 1 and FIG. 2 simultaneously. When the touch sensing layer 120 is unfolded, the touch sensing layer 120 has a length L1, which is a distance between an edge of the first side 140a and an edge of the second side 140b. There is a length L2 between the first edge 112 and the second edge 114 of the light-transmissive cover 110. A ratio of the length L1 to the length L2 is greater than 1 and smaller than 2, and thus the touch sensing layer 120 has enough space to be folded on the display module.

In the present embodiment, after the touch sensing layer 120 is folded, a sum of the area of the first folding region 142 located on the display module 150 and the area of the second folding region 144 located on the display module 150 is smaller than the area of the display module 150. That is, the first folding region 142 located on the display module do not contact and overlap with the second folding region 144 located on the display module. In this way, the present disclosure not only can improve the attachment efficacy of the touch sensing layer 120 but also can avoid multiple times of folding, and reduce the interferences among components, thus increasing the product yield.

Furthermore, in the present embodiment, after the touch sensing layer 120 is folded, at least one portion of the light-transmissive cover 110 is not covered by the first folding region 142 and the second folding region 144. In the present embodiment, when the first side 140*a* and the second side 140*b* of the touch sensing layer 120 are folded, the light-transmissive cover 110, the touch sensing layer 120 and the display module 150 collectively form a first projection area. When the first side 140*a* and the second side 140*b* of the touch sensing layer 120 are unfolded, the light-transmissive cover 110 and the touch sensing layer 120 collectively form a second projection area. Because the second projection area is greater than the first projection area, the narrow boarder design of the touch panel 100 can be achieved.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A touch panel, comprising:
   a light-transmissive cover;
   a display module disposed on the light-transmissive cover; and
   a touch sensing layer disposed between the light-transmissive cover and the display module, wherein the touch sensing layer has at least one conductive trace, a bonding pad, a first side and a second side opposite to the first side, the first side has a first folding region, and the second side has a second folding region, wherein when the first side and the second side of the touch sensing layer are unfolded, the first folding region and the second folding region extend outward from two opposite edges of the light-transmissive cover; and when the first side and the second side of the touch sensing layer are folded, the first folding region and the second folding region are located on the display module, wherein when the first folding region and the second folding region are folded, the light-transmissive cover, the touch sensing layer, and the display module collectively form a first projection area, and when the first side and the second side are unfolded, the light-transmissive cover and the touch sensing layer collectively form a second projection area that is larger than the first projection area, and wherein the conductive trace is electrically connected to the display module and the bonding pad, and the bonding pad is disposed on a third side of the touch panel.

2. The touch panel of claim 1, wherein when the first side and the second side of the touch sensing layer are folded, each of the first folding region and the second folding region is overlapped with a portion of the light-transmissive cover and a portion of the display module.

3. The touch panel of claim 1, wherein the touch sensing layer has an active region and a periphery region that surrounds the active region, and the first folding region and the second folding region are located in the periphery region.

4. The touch panel of claim 1, further comprising:
   an optically clear adhesive disposed between the touch sensing layer and the light-transmissive cover.

5. The touch panel of claim 4, wherein the optically clear adhesive further extends to the first folding region or the second folding region of the touch sensing layer.

6. The touch panel of claim 1, further comprising:
   an optically clear adhesive disposed between the display module and the touch sensing layer.

7. The touch panel of claim 1, wherein when the first side and the second side of the touch sensing layer are unfolded, a ratio of a length of the touch sensing layer to a length of the light-transmissive cover is greater than 1 and smaller than 2.

* * * * *